United States Patent
Peterson et al.

(10) Patent No.: US 10,759,919 B2
(45) Date of Patent: Sep. 1, 2020

(54) POLYURETHANE GEL PARTICLES, METHODS AND USE IN FLEXIBLE FOAMS

(71) Applicant: L&P Property Management Company, South Gate, CA (US)

(72) Inventors: Bruce W. Peterson, Fort Smith, AR (US); Mark L. Crawford, Rudy, AR (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 16/173,742

(22) Filed: Oct. 29, 2018

(65) Prior Publication Data

US 2019/0169390 A1 Jun. 6, 2019

Related U.S. Application Data (63) Continuation of application No. 14/657,756, filed on Mar. 13, 2015, now Pat. No. 10,113,043, which is a continuation-in-part of application No. 13/932,535, filed on Jul. 1, 2013, now abandoned, which is a continuation-in-part of application No. 12/713,586, filed on Feb. 26, 2010, now Pat. No. 8,933,139.

(60) Provisional application No. 61/667,824, filed on Jul. 3, 2012.

(51) Int. Cl.
| | |
|---|---|
| *C08J 9/40* | (2006.01) |
| *C08J 9/00* | (2006.01) |
| *C08G 18/64* | (2006.01) |
| *C08G 18/76* | (2006.01) |
| *C08G 18/48* | (2006.01) |
| *C08L 75/04* | (2006.01) |
| *C08G 101/00* | (2006.01) |

(52) U.S. Cl.
CPC ........ *C08J 9/0009* (2013.01); *C08G 18/4804* (2013.01); *C08G 18/6484* (2013.01); *C08G 18/7664* (2013.01); *C08J 9/405* (2013.01); *C08L 75/04* (2013.01); *C08G 2101/0008* (2013.01); *C08G 2101/0083* (2013.01); *C08G 2220/00* (2013.01); *C08J 2205/05* (2013.01); *C08J 2205/06* (2013.01); *C08J 2375/04* (2013.01); *C08J 2475/04* (2013.01)

(58) Field of Classification Search
CPC ............ C08G 18/4804; C08G 18/6484; C08G 18/7664; C08G 2101/0008; C08G 2101/0083; C08G 2220/00; C08J 9/0009; C08J 9/35; C08J 9/405; C08J 9/42; C08J 2205/05; C08J 9/06; C08J 2375/04; C08J 2475/04; C08L 75/04
See application file for complete search history.

(56) References Cited

U.S. PATENT DOCUMENTS

| | | | |
|---|---|---|---|
| 3,150,109 A | * | 9/1964 | Ferrigno ................ C08G 18/10 521/122 |
| 3,255,128 A | | 6/1966 | Farkas et al. |
| 3,833,951 A | | 9/1974 | Hurwitz |
| 4,456,642 A | | 6/1984 | Burgdorfer et al. |
| 4,756,958 A | | 7/1988 | Bryant et al. |
| 4,807,696 A | | 2/1989 | Colvin et al. |
| 5,007,478 A | | 4/1991 | Sengupta |
| 5,362,834 A | | 11/1994 | Schapel et al. |
| 5,366,801 A | | 11/1994 | Bryant et al. |
| 5,499,460 A | | 3/1996 | Bryant et al. |
| 5,637,389 A | | 6/1997 | Colvin et al. |
| 5,722,482 A | | 3/1998 | Buckley |
| 5,804,297 A | | 9/1998 | Colvin et al. |
| 5,851,338 A | | 12/1998 | Pushaw |
| 5,908,871 A | | 6/1999 | Frey et al. |
| 5,955,188 A | | 9/1999 | Pushaw |
| 6,004,662 A | | 12/1999 | Buckley |
| 6,025,067 A | * | 2/2000 | Fay .......................... B32B 27/08 428/314.4 |
| 6,048,810 A | | 4/2000 | Baychar |
| 6,183,855 B1 | | 2/2001 | Buckley |
| 6,235,801 B1 | | 5/2001 | Morales et al. |
| 6,265,457 B1 | | 7/2001 | Dolgopolsky et al. |
| 6,319,599 B1 | | 11/2001 | Buckley |
| 6,387,973 B1 | | 5/2002 | Saleh et al. |
| 6,772,825 B2 | | 8/2004 | Lachenbruch et al. |
| 6,855,410 B2 | | 2/2005 | Buckley |
| 6,908,979 B2 | | 6/2005 | Arendoski |
| 7,361,695 B2 | | 4/2008 | Tu et al. |
| 7,737,192 B2 | | 6/2010 | Yano |
| 7,793,372 B2 | | 9/2010 | Lean et al. |
| 7,827,704 B2 | | 11/2010 | Fox et al. |
| 8,070,876 B1 | | 12/2011 | Jiang |
| 2001/0018466 A1 | | 8/2001 | Gansen et al. |
| 2001/0056129 A1 | | 12/2001 | Stender et al. |
| 2002/0031659 A1 | | 3/2002 | Gansen et al. |
| 2003/0088019 A1 | | 5/2003 | Pause et al. |
| 2003/0203182 A1 | | 10/2003 | Thomson |
| 2004/0102573 A1 | | 5/2004 | Stender et al. |
| 2006/0183849 A1 | | 8/2006 | Liu et al. |

(Continued)

FOREIGN PATENT DOCUMENTS

| | | |
|---|---|---|
| WO | 2009-070801 A1 | 6/2009 |
| WO | 2010-129647 A1 | 11/2010 |
| WO | 2011-069928 A1 | 6/2011 |

OTHER PUBLICATIONS

Parker, S.P., McGraw-Hill Encyclopedia of Chemistry, McGraw-Hill, New York, pp. 818-819 (1983).

(Continued)

*Primary Examiner* — John M Cooney
(74) *Attorney, Agent, or Firm* — Wood Herron & Evans LLP (57) ABSTRACT

Combinations of open cell flexible foams with polyurethane gel particles, and methods of making the combinations are described using a variety of procedures. The open cell flexible foam may partially or wholly comprise polyurethane foam and latex foam.

26 Claims, 4 Drawing Sheets

(56) References Cited

U.S. PATENT DOCUMENTS

| | | |
|---|---|---|
| 2007/0066788 A1 | 3/2007 | Hoffmann et al. |
| 2009/0142551 A1 | 6/2009 | Fox et al. |
| 2009/0306237 A1 | 12/2009 | Babb et al. |
| 2010/0047550 A1* | 2/2010 | Prissok ............... C08G 18/10 428/313.5 |
| 2011/0196329 A1 | 8/2011 | Eckstein et al. |
| 2012/0070606 A1 | 3/2012 | Villata |
| 2012/0149795 A1 | 6/2012 | Schleiermacher et al. |
| 2013/0079431 A1* | 3/2013 | Smiecinski ............... C08J 9/35 521/137 |

OTHER PUBLICATIONS

Quality Foam Packaging web page, http://www.qualityfoam.com/polyester-polyurethane.asp (2014).

* cited by examiner

POLYURETHANE GEL PARTICLES, METHODS AND USE IN FLEXIBLE FOAMS

CROSS-REFERENCES TO RELATED APPLICATIONS

This application is a continuation application of U.S. Ser. No. 14/657,756 filed Mar. 13, 2015 which issued Oct. 30, 2018 as U.S. Pat. No. 10,113,043, which is a continuation-in-part patent application of U.S. Ser. No. 13/932,535 filed Jul. 1, 2013, now abandoned, which in turn claims the benefit of U.S. Provisional Patent Application 61/667,824 filed Jul. 3, 2012, and is a continuation-in-part of U.S. Ser. No. 12/713,586 filed Feb. 26, 2010, issued as U.S. Pat. No. 8,933,139 on Jan. 13, 2015, all of which are incorporated herein by reference in their entirety.

TECHNICAL FIELD

The invention relates to methods for making and using polyurethane gel elastomer as a carrier, sequestering agent, and/or an encapsulant for one or more phase change materials, otherwise known as "PCM", and optional additives such as thermally-conductive materials to enhance thermal conductivity of the polyurethane gel. The classical definition of gel is a solid three-dimensional molecular network comprised of a substantially cross-linked system of elastomeric polymers distributed in a gelatinous matrix of any form, shape, or size which exhibits no flow at steady-state. The term "gel" is defined herein to mean a soft elastomer solid which may be jelly-like or gelatinous in nature and which includes gels, but does not include gels which may melt within a temperature range that may be occupied by humans, i.e. from about 60° F. to about 110° F. (about 16° C. to about 41° C.). The polyurethane gel elastomer containing one or more phase change materials will be used either alone or in combination with polyether polyurethane foams, polyester polyurethane flexible foams or latex foams and relates to foams so made. Alternatively, the polyurethane gel elastomer may not contain one or more phase change materials, but instead use additives such as thermally conductive materials to increase the thermal conductivity of polyurethane gel ("PU Gel"). PU Gel will be used either alone or in combination with polyether polyurethane foams, polyester polyurethane flexible foams or latex foams and relates to foams so made. The invention more specifically relates to mattresses, pillows, bedding products, furniture cushioning upholstery, carpet pads, floor mats, bath mats, pet beds, shoe inserts, medical foams and cushioning, seat cushions and backs, automotive foam and cushioning, sports cushioning, transportation cushioning, headrests, arm rests and the like.

TECHNICAL BACKGROUND

Flexible polyurethane foam is commonly produced by methods of molding and free-rise. The process of molding polyurethane flexible foam involves introducing chemicals required for making foam (in one non-limiting embodiment, one or more polyols, one or more isocyanates and one or more additives) in the desired ratio by injection or open pour into an individual, multiple or continuous mold and allowing the reacting foam system to fill the mold(s). There are many types of free-rise foam machines. Examples of these include, but are not necessarily limited to, Open-Box Pouring Machines and Continuous Foam Machines such as Direct Lay-Down Machines and Maxfoam Process Machines. In a Continuous Direct Lay-Down foam process, chemicals are metered and mixed through a mix-head and applied to a conveyed paper or film, upon which the foam chemicals react and rise as the mix is carried away from the lay-down area.

It would be helpful and desirable to develop new, alternative and/or improved foams and methods for making the polyurethane flexible foams that have combined and/or improved properties.

SUMMARY

There is provided, in a non-restrictive embodiment, a method of producing polyurethane gel elastomers containing one or more phase change materials, referred herein as ("PCPU Gel"), and the PCPU Gel so made, in which the phase change material has a melting point in the range of about −10° F. to about 220° F. (about −23° C. to about 104° C.). Phase-change materials may be dispersed within the PCPU Gel either alone or in combination with other plasticizing materials such as mineral oil. The phase-change materials can optionally be located on the outside either alone or in some combination of inside and outside of the PCPU Gel. Thermally-conductive materials, if added, are solid and have a thermal conductivity range of from about 0.1 W/(m-° K) to about 2000 W/(m-° K). Surface modifiers can optionally be added to modify tackiness and fusion of PCPU Gel particles. The PCPU Gel may be added to either polyurethane foam or latex and integrated within the reacting polyurethane foam component mixture or latex foam components or combined with polyurethane foam or latex foam in some combination.

There is provided, in one non-limiting form, methods of forming polyurethane gel elastomers, referred herein as ("PU Gel") and the PU Gel so made. Thermally-conductive materials, if added, are solid and have a thermal conductivity range of 0.1 W/(m-° K)–2000 W/(m-° K). Surface modifiers can optionally be added to modify tackiness and fusion of PU Gel particles. The PU Gel may be added to either polyurethane foam or latex and integrated within the reacting polyurethane foam component mixture or latex foam components or combined with polyurethane foam or latex foam in some combination. Prior documents such as WO 2011/069928 (De Kesel; incorporated herein by reference in its entirety) essentially envelopes an organogel with polyurethane foam by premixing organogel particles with polyurethane reactant, and incorporating the organogel particles in situ to reduce tackiness. In contrast, the compositions discovered herein comprising a combination of open cell flexible foam and polyurethane gel particles that does not require "enveloping"; that is, there is an absence of enveloping with polyurethane or an impermeable layer.

There is provided, in one non-limiting form, methods of forming PCPU Gel or PU Gel, which may be cast or ground into shapes or sizes such as spheres, powder, granular form, discrete visible particles between the range of about 0.01 to 12 millimeters in size, which can be used alone or in some combination with polyurethane foam or latex foam. The method involves producing a PCPU Gel or PU Gel by reacting a polyol with one or more isocyanates in a low index formulation with index in the range of about 0.62 to about 0.90, optionally in the presence of a crosslinking catalyst, heat, or both, optionally with a plasticizer, phase change materials, thermally-conductive materials, other additives, and combinations thereof.

Additionally, there is provided, in a non-restrictive embodiment, methods of making PCPU Gel or PU Gel and reducing the size of the gel elastomer into smaller particles having an average particle size between the range of about 0.01 to 12 millimeters. Additionally, the method includes introducing the PCPU Gel particles, PU Gel particles, or some combination thereof into a mixture of polyurethane foam-forming components which include a polyol and an isocyanate. The PCPU Gel particles, PU Gel particles and combinations thereof are added in the range of about 0.1 to about 200 parts per hundred of the polyol component of polyurethane foam. The method also involves polymerizing the polyol and the isocyanate to form polyurethane foam. After polymerizing the polyol and the isocyanate, the PCPU Gel or PU Gel particles are discrete visible particles dispersed uniformly through the open cell flexible foam. Additionally, the PCPU Gel particles, PU Gel particles, or some combination may be added to either polyurethane foam or latex and integrated within the reacting polyurethane foam component mixture or latex foam components or combined with polyurethane foam or latex foam in some combination. Suitable latex foam production processes known by those skilled in the art for latex foam manufacturing include, but are not necessarily limited to, molded and free-rise latex methods produced with the Dunlop or Talalay latex processes. In the Talalay latex process, the latex foam is cured by introducing carbon dioxide into the mold with latex. The carbon dioxide reacts with water forming carbonic acid, which lowers the pH and causes the latex to thicken and hold its cell structure and shape. The mold temperature is then raised to about 230° F. and held for a determined amount of time to crosslink or vulcanize the latex polymer. In the Dunlop process, the latex mixture is cured by addition of chemical additives such as sodium fluorosilicate and later the latex is vulcanized to crosslink or vulcanize by raising the temperature. The PCPU Gel, PU Gel, or some combinations may be added in the range of about 0.1 to about 200 parts per hundred of the rubber component of latex foam before the latex foam is cured.

There is also provided, in a non-restrictive embodiment, combinations of PCPU Gel, PU Gel, and flexible foam such polyether polyurethane flexible foams, polyester polyurethane flexible foams or latex foams. Articles may be manufactured from these combinations of PCPU Gel, PU Gel, and polyurethane foam including, but not necessarily limited to, mattresses, pillows, bedding products, rebond carpet pads, floor mats, bath mats, pet beds, shoe inserts, medical cushioning foams (e.g. wheelchair pads, medical bedding and gurney pads), pillows, seat cushions, seat backs, head rests, armrests, sports equipment, upholstered products, and combinations thereof.

It will be appreciated that FIGS. 1-3 and 4-9 are schematic and that the various elements are not necessarily to scale or proportion, and that many details have been removed or simplified for clarity, and thus the invention is not necessarily limited to the embodiments depicted in the Figures.

DETAILED DESCRIPTION

It has been discovered that polyurethane elastomers containing one or more phase change additives, referred herein as ("PCPU Gel"), have high thermal storage capacity and useful thermal properties for comfort control. PCPU Gel has a soft gel quality and can be tailored to be viscoelastic or elastic in nature as measured by the ball rebound test per ASTM D3574 method. Optionally, PCPU Gel may be further modified by addition of thermally conductive materials and other additives further described herein. The properties of gel elastomers may be influenced by covalent crosslinking and/or hydrogen-bonding.

It has also been discovered that polyurethane elastomers, referred herein as ("PU Gel"), have higher thermal conductivity relative to open cell flexible polyurethane foam and useful thermal properties for comfort control. PU Gel has a soft gel quality and can be tailored to be viscoelastic or elastic in nature as measured by the ball rebound test per ASTM D3574 method. Optionally, PU Gel may be further modified by addition of thermally conductive materials and other additives further described herein.

The PCPU Gel, PU Gel, or combinations thereof ("PCPU Gels, PU Gel, and combinations thereof" is referred hereafter as "Gel") can be cast either singly or continuously into slab sheets or layers, or into various article forms, shapes or sizes such as spheres, powder, granular form, particles sizes between the range of about 0.01 to 12 millimeters. Gel in sheet or layer form may be solid, perforated, textured, continuous, discontinuous, patterned, randomly textured, variegated, spotted, streaked, marbled, sprayed, and applied and formed in other ways. Gel can be cut or ground down to particle sizes between the range of about 0.01 to 12 millimeters and incorporated into polyether or polyester polyurethane foam while the foam is being produced. That is, Gel is incorporated in the polyurethane foam during the foaming reaction. Gel can be produced as articles and used in conjunction with prior and separately manufactured polyurethane, polyester foam, or latex foam as discrete components or layers.

In a non-limiting embodiment, Gel particles with average particle size between the range of about 0.01 independently to about 12 millimeters are added in the range of about 0.1 independently to about 200 parts per hundred parts of the polyol component of polyurethane foam. In an alternative, non-restrictive version, the Gel is added in the range of about 5 independently to about 50 parts per hundred parts of the polyol component of polyurethane foam. By "independently", it is meant that any lower threshold may be combined with any upper threshold for an effective range herein. Further, the Gel may be added in the range of about 30 parts independently to about 40 parts per hundred parts of the polyol component.

The addition of PCPU Gel to open cell flexible polyurethane foam or latex foam changes the temperature properties of the combination with the foam in a measurable way. Phase change materials undergo an enthalpy or energy change due to heat of fusion around its melting point. Combining phase change materials with open cell flexible foam gives a potential for a higher heat capacity than using open cell flexible foam alone; however, incorporation of phase change materials in open cell flexible foam such as polyurethane foam or latex foam tend to have low thermal conductivities similar to the base open cell flexible foam. PCPU has thermally-conductive properties superior to open cell flexible foam. By incorporating phase change materials into a PU Gel to make a PCPU Gel, and incorporating said PCPU Gel within open cell flexible foam, the combined desirable effect of increasing thermal conductivity and thermal storage capacity is achieved. When such a combination is used in bedding materials such as mattresses and pillows, the two features combine to promote greater heat transfer and more comfortable sleep.

Open cell flexible foam generally has a low thermal conductivity and if a phase change material is incorporated in a foam, some of the phase change material will be isolated and ineffective because the thermal conductivity of the combination of flexible foam and phase change material without PU Gel is very low. The utility of phase change material incorporated within open cell flexible polyurethane foam or latex foam will be largely limited to area in direct contact with a heat source such as a human body. A key attribute of this invention is that by combining a conductive PU Gel with high heat capacity phase change material within an open cell flexible foam, a much greater amount of the phase change material will be available to provide some cooling directly under a person's body, but the contact area of a person lying on a mattress is a relatively small percentage of the whole volume of the mattress. By closely combining conductive Gel and capacitive phase change material, much more of the mattress can engage in thermal regulation and act as a radiator or heat exchanger to move, absorb, store and release heat generated by a person.

The PU Gel component of PCPU Gel has the unique property of acting as a heat transfer pathway when dispersed in an open cell flexible polyurethane foam or latex foam. When polyurethane foam containing PCPU Gel particles is compressed, PCPU Gel particles contact other Gel particles. Heat is transferred from one Gel particle to the next Gel particle in contact or close proximity, so that the thermal conductivity is increased and the migration of heat over longer distances is facilitated.

The addition of phase change materials (PCMs) to the gel particles provides temperature regulating properties of the gel and foam article. Phase change materials, as defined herein, correspond to materials that change states such as changing from a solid to a liquid state, which stores energy as the PCM goes from a relatively low enthalpy state to a relatively high enthalpy state. Alternatively, the PCM can change from a liquid to a solid state which releases energy as the PCM goes from a relatively high enthalpy state to a relatively low enthalpy state. As the temperature of the phase change gel and foam article increases and reaches the melting point of the phase change material, the temperature of the article is held constant at the PCM's melting point. Once the PCM has completely melted, the temperature of the phase change gel/foam combination will begin to increase again. As the temperature of the phase change gel/foam combination cools down and reaches the PCM's freezing point, the temperature of the article is held constant at the freezing point. Once the PCM has completely solidified by freezing, the temperature of the article will begin to decrease again. The phase change material in the compositions and methods herein may also be a solid that does not change states but has the capacity to store energy over various different solid phases, such as by molecular rearrangements.

Figure 3A:
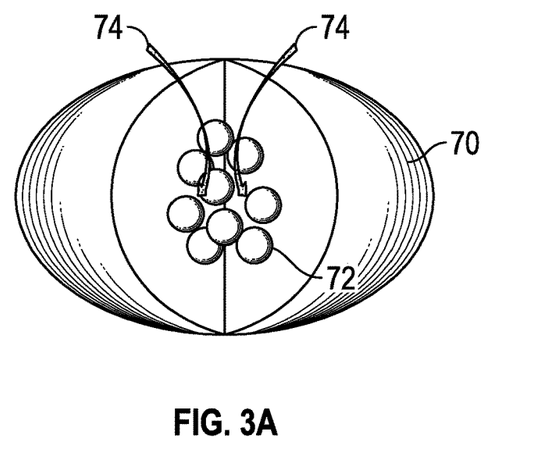
FIG. 3A is a schematic illustration of a phase change gel bead absorbing heat.
Figure 3B:
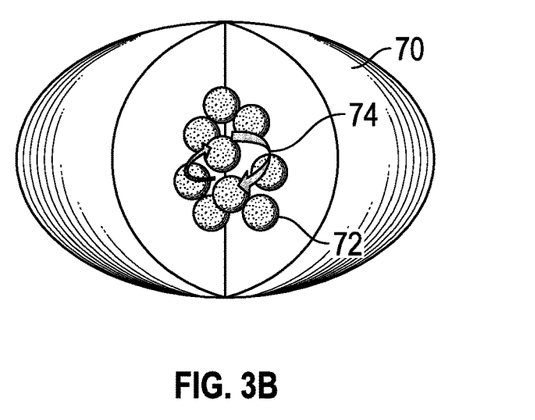
FIG. 3B is a schematic illustration of a phase change gel bead where the phase change material has melted from the solid form.
Figure 3C:
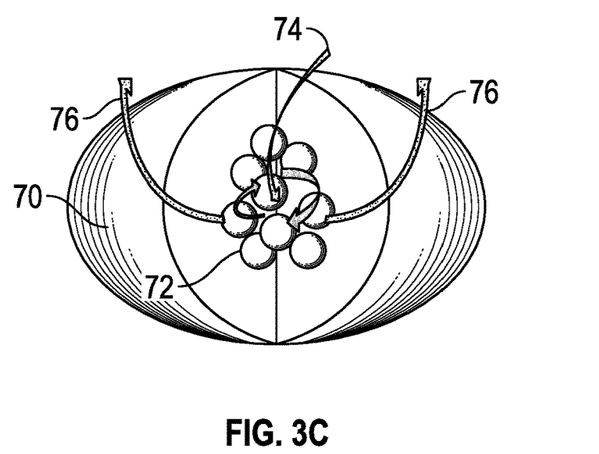
FIG. 3C is a schematic illustration of a phase change gel bead.
Figure 4:
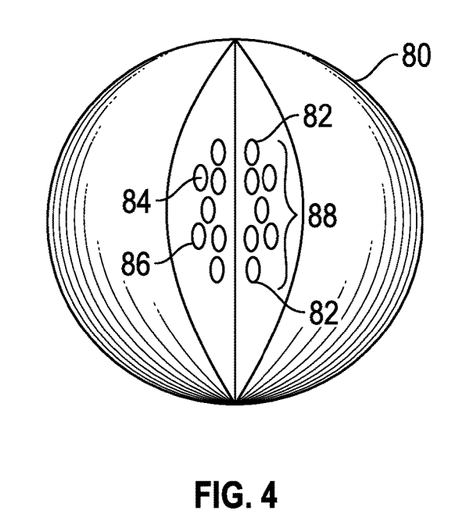
FIG. 4 is a schematic, partial sectional illustration of an encapsulated phase change material (PCM) that is in turn encapsulated or contained at or near the center of a gel particle.

The combination of gel particles and phase change materials can be arranged so one or more phase materials are located on the inside of the Gel particle. In one non-limiting embodiment, a Gel particle can be constructed such that the phase change component is at the center core of the particle and surrounded by gel. An example of a Gel particle is shown in FIG. 3A where 70 is a gel particle having multiple solid (white) phase change materials 72 therein. When the phase change materials 72 absorb heat as shown by dark gray arrows 74 (FIG. 3A), the phase change materials 72 melt and become liquid (shown as light gray in FIG. 3B). The phase change materials 72 inside gel particle 70 thus absorb heat and cool the surrounding environment (lighter gray arrows 76; see FIG. 3C). Shown in FIG. 4 is a photomicrograph of gel particles 70 in a polyurethane foam matrix 78. Alternatively, one or more phase change materials may be homogeneously or heterogeneously dispersed throughout the entire gel particle. Alternatively, one or more phase change materials may be attached, grafted, or bound to at least part of or all of the outer surface of the gel particle.

Figure 5:
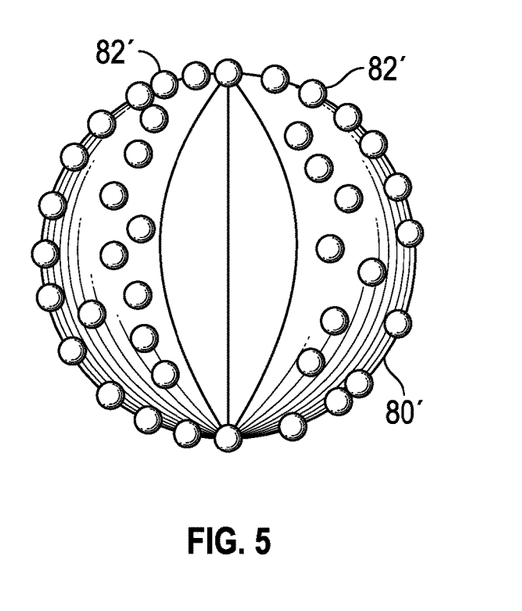
FIG. 5 is a schematic, partial sectional illustration of encapsulated PCMs bound to or on the outside of a gel particle.
Figure 6:
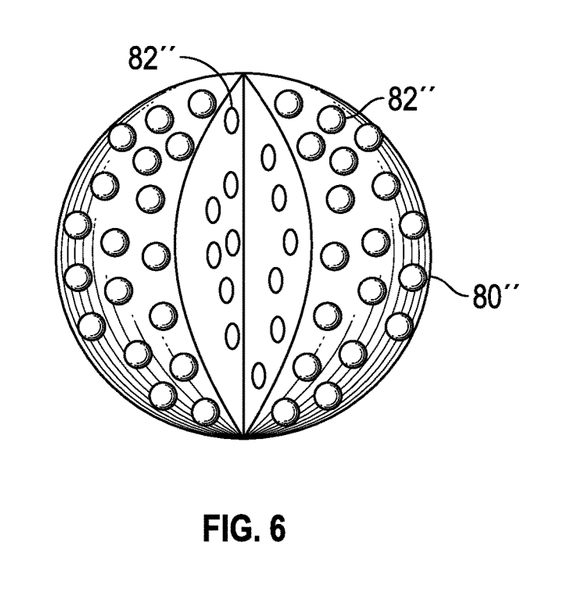
FIG. 6 is a schematic, partial sectional illustration of a gel particle having encapsulated PCMs dispersed generally homogeneously on and within the gel particle.

Shown in FIGS. 4-9 are schematic, partial, sectional illustrations of various non-limiting embodiments schematically showing the physical structure of phase change material (PCM) in relation to the gel particles which may occur when PCM is introduced into a plasticized copolymer resin as described herein. Shown in FIG. 4 is a Gel particle 80 having encapsulated PCM 82 incorporated at or near the center of Gel particle 80 forming a PCM core 88. Each encapsulated PCM 82 has the structure of a core 84 (in a non-limiting example, a $C_{18}$ wax particle) coated with a shell 86 (in a non-limiting example, a melamine-formaldehyde polymer, acrylic-based polymer, or other crosslinking resin). In a non-limiting embodiment, the encapsulated PCM 82 has an average particle size of from about 1 independently to about 1000 microns; alternatively from about 2 independently to about 800 microns; in another non-limiting embodiment from about 5 to about 600 microns; and in a different non-restrictive embodiment from about 10 to about 300 microns. Shown in FIG. 5 is a gel particle 80' having multiple encapsulated PCMs 82' on the outside or on the surface thereof. Shown in FIG. 6 is a Gel particle 80" having encapsulated PCMs 82" dispersed and distributed generally homogeneously on and within gel particle 80".

Figure 7:
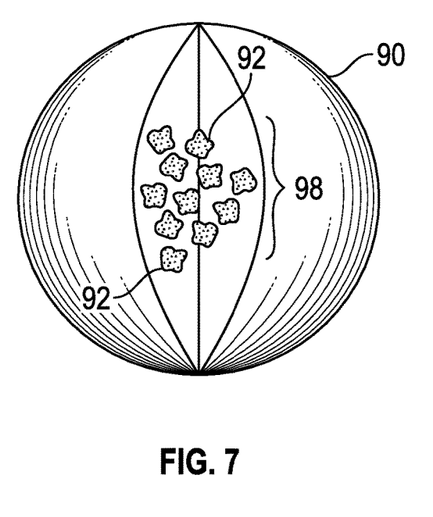
FIG. 7 is a schematic, partial sectional illustration of a gel particle having liquid and/or solid PCM encapsulated or contained within a gel particle.
Figure 8:
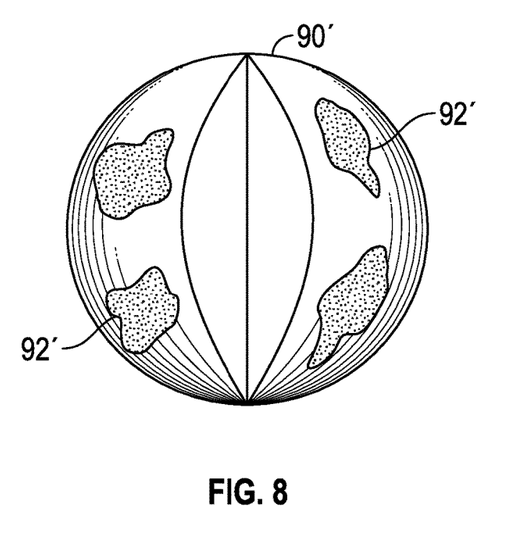
FIG. 8 is a schematic, partial sectional illustration of a gel particle having liquid and/or solid PCM at least partially covering the surface of a gel particle.
Figure 9:
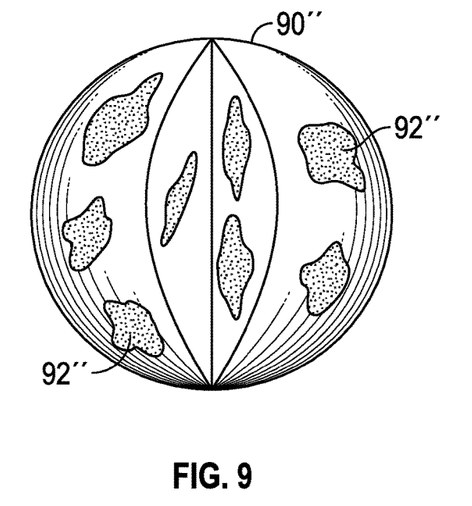
FIG. 9 is a schematic, partial sectional illustration of liquid and/or solid PCM dispersed generally homogeneously on and within a gel particle.

In further non-restrictive versions, FIG. 7 shows a Gel particle 90 having liquid and/or solid PCM particulates 92 incorporated at or near the center of Gel particle 90 forming a PCM core 98. The PCM particulates 92 may be any of those described elsewhere herein. Again, the PCM particulates 92 may have an average particle size of from about 1 independently to about 1000 microns. Shown in FIG. 8 is a Gel particle 90' having multiple PCMs 92" on the outside or the surface thereof. Shown in FIG. 9 is a Gel particle 90"' having and/or solid PCM particulates 92″ dispersed and distributed generally homogeneously on and within Gel particle 90″.

Polyurethane Flexible Foam Component

As defined herein, the term polyurethane foam means polyether-based polyurethane foam or polyester-based polyurethane foam or a combination polyether and polyester polyurethane foam. As noted, polyurethane foam is commonly produced by methods of molding and free-rise. A common design for continuous free-rise processing equipment is the MAXFOAM machine, available from Beamech Group Limited. This type of machine, schematically illustrated in FIG. 1, uses a trough 12 where the chemicals are first introduced from a mixing head 14. The foam chemicals (including, but not necessarily limited to, polyol(s), water, silicone surfactant, catalyst, blowing agent(s), and isocyanate) stay in the trough 12 for about 10 to 25 seconds and then spill over the trough lip onto a series of fall-plates 16 leading to the main conveyor 18. The fall-plates 16, sidewalls (not shown) and conveyor(s) 18 are protected from the reacting foam chemicals by a continuous film feed (bottom film, side films and additional films for block shaping; not shown in FIG. 1). Flexible polyurethane foam 20 is continuously produced by this technique.

Figure 1:
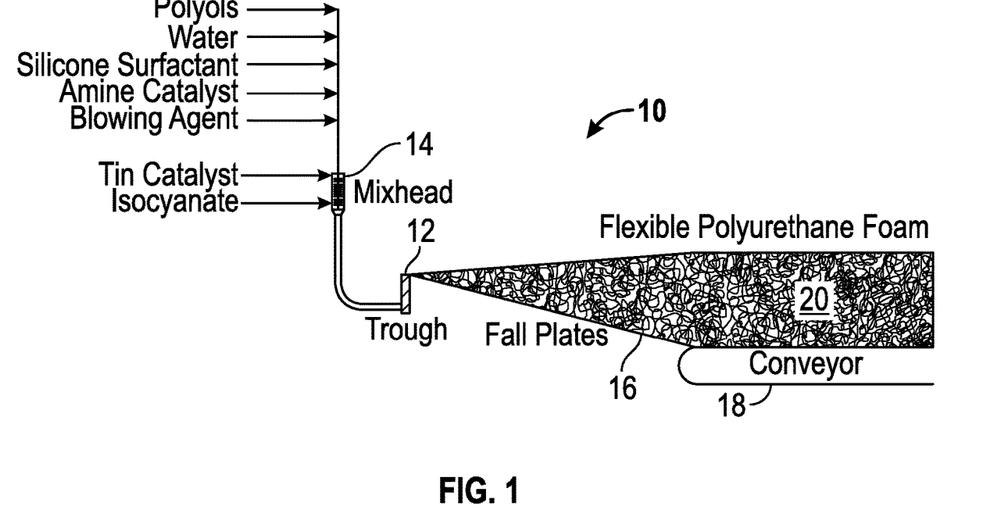
FIG. 1 is a schematic illustration of a continuous, free-rise polyurethane foam processing apparatus.
Figure 2:
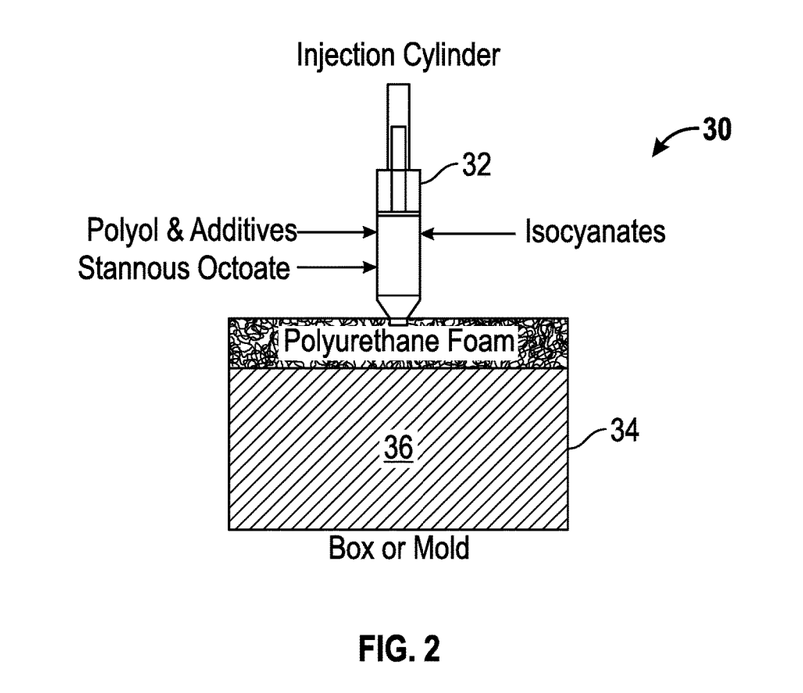
FIG. 2 is a schematic illustration of a box-pour machine for polyurethane foam.

Another common method of producing free-rise flexible foam is with a box-pour machine 30, as schematically illustrated in FIG. 2. This is a batch process whereby the foam chemicals are mixed and introduced in a variety of methods. These methods include but are not limited to the following: a mix-head or injection cylinder 32 using metered chemicals, manual or automatic addition by weight, reaction-injection-molding (RIM) and injection cylinders are known methods of introducing the chemicals into a container 34 (box, mold or cylinder). The contain-ers are typically lined with cardboard or plastic film to facilitate removal of the foam 36.

Optionally, other additives may be incorporated into the foam-forming composition. The optional additives include, but are not limited to, flame retardants, stabilizers, antimicrobial compounds, extender oils, dyes, pigments, and anti-static agents.

The flexible polyurethane foam described herein may be produced under pressure or under vacuum using batch processes or continuous processes. Pressure can be applied by platens or conveyors which compress the foam while the foam is not fully cured. Alternatively, the method is practiced under atmospheric pressure, in the regime of atmospheric pressure to greater than atmospheric pressure, or in the regime of atmospheric pressure to less than atmospheric pressure. The process may be a free rise process or may involve a mold as previously described.

PCPU or PU Gel Polymers

PCPU Gel Polymers, PU Gel polymers, or combinations thereof ("Gels"), as disclosed herein, are formed by reacting an isocyanate comprising of at least 2 isocyanate groups with isocyanate-reactive materials, such as polyether polyols. Polyether polyol includes linear and branched polyethers (have ether linkages) containing at least two hydroxyl groups, and includes polyoxyethylene polyether polyols, polyoxypropylene polyether polyols or mixed poly(oxyethylene/oxypropylene) polyether polyols. Generally, polyethers are the polyoxyalkylenepolyols, particularly the linear and branched poly (oxyethylene) glycols, poly (oxypropylene) glycols and their copolymers. Other alkylene oxides besides ethylene oxide and propylene oxide may be used to produce suitable polyols. Polyester polyols may also be used to produce Gel polymers. It will be appreciated that in the context herein the term "polyol" encompasses and includes "polymer polyols" as those are generally defined in the industry.

Polyol useful herein for producing Gels may have a functionality of 2.0 to 8.0 using single or mixed initiators including but not limited to glycerin (glycerol), trimethylolpropane (TMP), propylene glycol (PG), dipropylene glycol (DPG), ethylene glycol (EG), diethylene glycol (DEG), methylpropanediol (mpdiol), water, sucrose, D-sorbitol, glucoside, starch glycosides, aliphatic amines such as ethylenediamine (EDA), ethanolamine, diethanolamine (DEOA), triethanolamine, diisopropanolamine, erythritol, butane diol, low molecular weight adducts of polyfunctional amines, polyfunctional alcohols, aminoalcohols, alcoholamines and mixtures thereof, and aromatic amines such as isomers of phenylenediamine, diethyl toluene diamine (DETA), pentaerythritol, isophoronediamine, 2,4,6-triamino-toluene, diethyltolylenediamine, and mixtures thereof, and the like. Polyol designs herein may have mixed, blocked or a combination of mixed and blocked ethylene oxide (EO) and mixed, blocked or a combination of mixed and blocked propylene oxide (PO), or may be based on natural sources or directly from natural sources such as, but not limited to, soy-bean oil or castor-bean polyol.

The functionality or average functionality of a polyol should be taken into consideration in designing the proper formulation for producing Gel. In one non-limiting embodiment, the use of low functionality (about 2) polyol is useful for the production of viscoelastic Gel. Gels may be made using a wide range of polyols and isocyanates. Polyol average functionalities typically range from about 2 to about 6, but may be higher in some cases, and isocyanate functionalities range from about 2 to about 6, but may be higher in some cases.

The isocyanate index used to produce Gel is determined by the desired properties and the functionality and equivalent weights of the polyol(s) and isocyanate(s) and other additives. The amount of isocyanate employed is frequently expressed by the term "index" which refers to the ratio of the total isocyanate used to the actual amount of isocyanate required for reaction with all of the active hydrogen-containing compounds present in the reaction mixture, multiplied by 100. For most Gel applications, the isocyanate index is in the range from 0.62 independently to 0.90; alternatively from 0.63 independently to 0.88; in another non-restrictive version from 0.64 independently to 0.86; and in a different non-limiting embodiment from 0.65 independently to 0.84; and in a different non-limiting version from 0.65 independently to 0.75. An isocyanate index between about 0.62 to about 0.75 is typically used for making viscoelastic Gel. The isocyanates may have a functionality of 2 to 8. Examples of isocyanates are 2,4-toluene diisocyanate (2,4-TDI), 2,6-toluene diisocyanate (2,6-TDI), hexamethylenediisocyanate (HDI), isophorone-diisocyanate (IPDI), 4,4'-Diphenylmethane diisocyanate (4,4'-MDI), 2,4'-Diphenylmethane diisocyanate (2,4'-MDI), Polymeric MDI (PMDI), 4,4'-Dicyclohexylmethane diisocyanate (HMDI). Other various isocyanate forms derivatives may be used such as uretidinedione or uretonimine-linked isocyanates. Depending on the isocyanate index, the Gel properties such as Bloom gram hardness and tactile vary with index. Polyurethane gel can show viscoelastic dampening properties, particularly with lower index levels in the range of 0.62 to 0.75. The dampening properties can be measured by ball rebound. Lower ball rebound numbers indicate higher dampening properties.

The formation of Gel is possible using a very wide range of polyurethane formulations, which include but are not limited to the use of polyether polyol(s) alone or in combination with polyester polyol(s), grafted co-polymer polyol(s), polymer modifiers, cross-linkers, chain extenders and plasticizers.

Cross-linking or chain-extending additives may be included in the Gel composition to enhance processing, physical properties, and foam stability. Typically, cross-linking or chain extending additives are relatively small molecules containing 2 to 6 active hydrogen groups, or primary or secondary amine groups, and are added in amounts from 0 to 10 parts per hundred parts polyol. Optional, representative cross-linking or chain-extending additives include, but are not necessarily limited to, diethanolamine (DEOA), ethylene glycol (EG), diethylene glycol (DEG), propylene glycol (PG), dipropylene glycol (DPG), 1,4-butanediol (BDO), methyl-propane diol, glycerin and short chain difunctional and polyfunctional polyether or polyester polyols. In one optional, non-restrictive embodiment, the cross-linking additives are included in amounts from 0 to 10.0 parts per hundred parts polyol. Alternatively however, the methods and compositions herein may be practiced in the absence of a chain extender or cross-linking additives. Optionally, monol-functional polyols or amines can be used as modifiers to achieve desired properties in the Gel products.

Plasticizers are typically added to soften the Gel elastomer. Typical plasticizers are phthalate plasticizers and oils such as paraffin mineral oils, aromatic oils, naphthenic mineral oils, and vegetable oils. Plasticizers suitable for making acceptable Gels include, but are not necessarily limited to, rubber processing oils such as paraffinic and naphthenic petroleum oils, highly refined aromatic-free paraffinic and naphthenic food and technical grade white petroleum mineral oils, synthetic oils and natural oils and polyols made from natural oils and natural polyols. Synthetic oils are high viscosity oligomers such as non-olefins, isoparaffins, paraffins, aryl and/or alkyl phosphate esters, aryl and/or alkyl phosphite esters, polyols, and glycols. Many such oils are known and commercially available. Examples of various commercially available oils include, but are not necessarily limited to, PAROL® and TUFFLO® oils. Natural oils, which are unhydrogenated, partially hydrogenated, or fully hydrogenated such as, but not limited to, coconut oil, palm oil, canola oil, safflower oil, sunflower oil, soybean oil, and/or castor oils may be used. Additionally, plasticizers can be derived from animal fats that are unhydrogenated, partially hydrogenated, or fully hydrogenated. Natural oil-based polyols are biologically-based polyols such as, but not limited to, soy-bean-based and/or castor bean polyols. Suitable plasticizers may also include, but are not necessarily limited to, phthalate esters including, but not necessarily limited to bis(2-ethylhexyl)phthalate, commonly abbreviated DEHP $(C_6H_4(C_8H_{17}COO)_2$, sometimes called dioctyl phthalate and abbreviated DOP, diisononylphthalate (DINP), waxes such as n-paraffins with carbon content greater than 14 that change from a liquid to a solid over the temperature range of expected use—for instance, once the wax has changed to a solid, it is no longer a "plasticizer", but the wax helps to reduce the viscosity when the wax is above its melting point.

Alternatively, water and/or a blowing agent may be added to the Gel formulation to expand and reduce the density, soften the gel, and/or modify the viscoelastic nature. Microcellular bubbles may be incorporated into the cured polyurethane gel to reduce the thermal conductivity of the gel. Water levels are typically in the range 0 to 0.5 parts per 100 parts polyol. A blowing agent may be included in the Gel composition. A common blowing agent is water that may be added in amounts from about 0 to 7 parts per hundred parts polyol. Water acts as a blowing agent when it reacts with isocyanates and produces carbon dioxide, which expands the polyurethane mixture. In one non-limiting embodiment, water as a blowing agent is added in an amount suitable to achieve a desired Gel density. Other blowing agents known as auxiliary blowing agents can be used in combination with water. However, the auxiliary blowing agent is not reacted in the Gel matrix but instead acts as an inert expansion gas.

Catalysts are used to control the relative rates of water-isocyanate (gas-forming) and polyol-isocyanate (gelling) reactions. The catalyst may be a single component, or in most cases a mixture of two or more compounds. In one non-limiting embodiment, suitable catalysts for Gel elastomers are stannous octoate, organotin salts such as dibutyltindilaurate, bismuth catalysts such as Coscat 83, zinc catalysts such as Coscat Z-22R, and tertiary amines, used singly or together. The amine catalysts are known to have a greater effect on the water-isocyanate reaction, whereas the bismuth and organotin catalysts are known to have a greater effect on the polyol-isocyanate reaction. Total catalyst levels generally vary from 0 to about 5.0 parts by weight per 100 parts polyol. The amount of catalyst used depends upon the formulation employed and the type of catalyst. The following ranges of catalyst amounts may be satisfactory: amine catalyst from 0 to 2 parts per 100 parts polyol; and organotin catalyst from 0 to 0.5 parts per 100 parts polyol.

One or more surfactants may also be employed in the Gel formulation. The surfactants lower the bulk surface tension, promote nucleation of cells or bubbles, stabilize the rising cellular structure and emulsify incompatible ingredients. The surfactants typically used in polyurethane foam applications are polysiloxane-polyoxyalkylene copolymers, which may generally be used at levels between about 0 and 3 parts by weight per 100 parts polyol. In the methods and compositions herein, from 0 to 2 parts by weight per 100 parts polyol of surfactant may be used, and alternatively 0 to 1 parts by weight per 100 parts polyol.

The Gel may also contain useful amounts of conventionally employed additives such as stabilizers, antioxidants, antistatic agents, antimicrobial agents, ultraviolet stabilizers, phase change materials, surface tension modifiers such as silicone surfactants, emulsifying agents, and/or other surfactants, extender oils, solid flame retardants, liquid flame retardants, grafting polyols, compatible hydroxyl-containing chemicals which are completely saturated or unsaturated in one or more sites, solid or liquid fillers, antiblocking agents, colorants such as inorganic pigments or colorants, carbon black, organic colorants or dyes, reactive organic colorants or dyes, heat-responsive colorant, heat-responsive pigment, heat-responsive dye, pH-responsive colorant, pH-responsive pigment, pH-responsive dye and combinations thereof, fragrances, and thermally-conductive materials with thermal conductivity values in the range of 0.1 W/(m-° K) to 2000 W/(m-° K) such as talc, melamine, carbon black, graphite, aluminum oxide, aluminum nitride, zinc oxide, ferric oxide, diamond, titanium dioxide, magnesium oxide, silicon carbide, boron nitride, sodium carbonate, sodium bicarbonate, calcium carbonate, barium sulfate, metal flakes such as aluminum, copper, and any other metal powder, and viscosity-modifiers such as fumed silica and clays, and other polymers in minor amounts and the like to an extent not affecting or substantially decreasing the desired properties of Gel herein.

Other polymers such as polyesters (PES), polyethylene terephthalate (PET), polyethylene (PE), low density polyethylene (LDPE), high density polyethylene (HDPE), polyvinyl chloride (PVC), polyvinylidene chloride (PVDC), poly-propylene (PP), polystyrene (PS), high impact polystyrene (HIPS), polyamides, nylon, acrylonitrile butadiene styrene (ABS), polycarbonate (PC), polyurethanes (PU), and triblockcopolymers may be melt-blended in with PCPU Gel. Triblock copolymers include, but are not necessarily limited to, (SB)n styrene-butadiene, (SEB)n, (SIS) styrene-isoprene-styrene block copolymers, (SEBS) styrene-ethylene-butylene-styrene block copolymers, (SEP) styrene-ethylene-propylene block copolymers, (SEEPS) styrene-ethylene-ethylene-propylene-styrene block copolymers, (SBS) styrene-butadiene-styrene block copolymers, (S-EB/S-S) styrene-ethylene-butylene/styrene-styrene copolymers, (S-EP/S-S) styrene-ethylene-propylene/styrene-styrene copolymers, (S-EEP/S-S) styrene-ethylene-ethylene-propylene/styrene-styrene copolymers, and the like. The term "n" here and with respect to these abbreviations elsewhere refers to the number of repeating polymer units. The triblock copolymers employed in the Gel may have the more general configuration of A-B-A. The A component represents a crystalline polymer end block segment of polystyrene; and the B component represents an elastomeric polymer center block segment. Elastomeric and polystyrene portions are incompatible and form a two-phase system consisting of sub-micron domains of glassy polystyrene interconnected by flexible elastomeric chains. These two discrete domains act as hard and soft block segments which help crosslink and reinforce the Gel.

Addition of phase change materials to the PU Gel to make PCPU Gel allows the foam article to store or release large amounts of energy, which is higher than heat absorption or heat release by heat capacity alone. Heat is stored if the solid phase change material changes to a liquid, and heat is released when the liquid phase change material changes to a solid. The melting point temperature is usually chosen to be in the 20° C. to 35° C. range to match the human comfort zone. Once the solid phase change material melts completely, all of the latent heat is used, and the phase change material must be cooled back down below its melting point to solidify the phase change material and recharge for the next melt cycle.

Table 1 shows a non-limiting list of phase change materials that can be used for making a PCPU Gel. The non-limiting list of phase change materials in Table 1 is for example purposes. Preferably, suitable phase change materials have a solid/liquid phase transition temperature from −10° F. to 220° F. (about −23° C. to about 104° C.). More preferably, the solid/liquid phase transition temperature is from 68° F. to 95° F. (20° C. to 35° C.). Typically, a phase change material is selected to have low solubility in the PCPU Gel, so that the phase change material can convert back to a solid after it has gone through a melt-cycle. Although the selected phase change material can have high solubility in the PCPU Gel, and upon cooling the phase change material will partially turn to a solid and partially stay as a liquid in the PCPU Gel. The phase change material may also be encapsulated such that the phase change material is a core surrounding by a coating to keep the liquid confined as the phase change material changes from a solid to a liquid. Microencapsulated phase change materials can be encapsulated by coatings such as, but not limited to, acrylic, melamine-formaldehyde, urea-formaldehyde coatings and the like. However, there are many other encapsulate coatings that may be used. The outside coating is selected to retain the phase change material for the freeze-thaw cycles and end use. The phase change material may have an average particle size of less than 1000 microns, where an optional lower size threshold is 1 micron.

During the polyurethane foaming reaction, phase change materials can destabilize the foaming mixture. Large cells, soft foams, and partial or complete collapses can occur if the phase change material is added to the liquid polyurethane foam reactants. Therefore, the intent of compositions and methods described herein is to use the PCPU Gel polymer as a carrier, sequestering agent, and/or encapsulant for PCM.

TABLE 1

Phase Change Materials Properties

| Phase Change Material | Transition Temperature ° F. | Transition Temperature ° C. | Latent Heat Btu/lb(kJ/kg) | Notes |
| --- | --- | --- | --- | --- |
| polyethylene glycol 600 | 68-77 | 20-25 | 63 (146) | non-paraffin organic |
| camphene | 50 | 10 | 102 (237) | non-paraffin organic |
| oxazoline wax | 122 | 50 | | non-paraffin organic |
| d-lactic acid | 79 | 26.1 | 79 (183) | non-paraffin organic |
| formic acid | 47 | 8.3 | 118 (274) | Organic |
| acrylic acid | 54 | 12.2 | 66.7 (155) | Organic |
| p-xylene | 56 | 13.3 | 68.1 (158) | Organic |
| caprylic acid | 61 | 16.1 | 63.7 (148) | Organic |
| jojoba wax | 52-53.2 | 11.2-11.8 | | insoluble fatty of natural oils and waxes |
| cotton seed oil | 94.1 | 34.5 | | insoluble fatty of natural oils and waxes |
| coconut | 77 | 25 | | insoluble fatty of natural oils and waxes |
| almond | 56.3 | 13.5 | | insoluble fatty of natural oils and waxes |
| beechnut | 74.3 | 23.5 | | insoluble fatty of natural oils and waxes |
| black mustard | 61.7 | 16.5 | | insoluble fatty of natural oils and waxes |
| candlenut | 68.9 | 20.5 | | insoluble fatty of natural oils and waxes |
| castor oil | 55.4 | 13 | | insoluble fatty of natural oils and waxes |
| corn oil | 65.3 | 18.5 | | insoluble fatty of natural oils and waxes |
| cotton seed stearin | 83.3 | 28.5 | | insoluble fatty of natural oils and waxes |
| esparto | 63.5 | 17.5 | | insoluble fatty of natural oils and waxes |
| poppy seed | 68.9 | 20.5 | | insoluble fatty of natural oils and waxes |
| rape seed (canola) | 66.2 | 19 | | insoluble fatty of natural oils and waxes |
| pumpkin seed | 136.4 | 58 | | insoluble fatty of natural oils and waxes |
| soy bean | 80.6 | 27 | | insoluble fatty of natural oils and waxes |
| sunflower | 73.4 | 23 | | insoluble fatty of natural oils and waxes |

TABLE 1-continued

Phase Change Materials Properties

| Phase Change Material | Transition Temperature °F. | Transition Temperature °C. | Latent Heat Btu/lb(kJ/kg) | Notes |
|---|---|---|---|---|
| walnut | 57.74 | 14.3 | | insoluble fatty of natural oils and waxes |
| white mustard seed | 59.9 | 15.5 | | insoluble fatty of natural oils and waxes |
| beeswax | 143 | 62 | 76 (177) | insoluble fatty of natural oils and waxes |
| $NH_4Cl\ Na_2SO_4\ 10H_2O$ | 52 | 11.1 | 70 (163) | hydration-dehydration reaction |
| $NaCl\ NH_4Cl\ 2Na_2SO_4\ 20H_2O$ | 55 | 12.8 | 78 (181) | hydration-dehydration reaction |
| $NaCl\ Na_2SO_4\ 10\ H_2O$ | 65 | 18.3 | 80 (186) | hydration-dehydration reaction |
| n-tetradecane | 41.9 | 5.5 | 98 (228) | hydrocarbon paraffins |
| n-pentadecane | 50 | 10 | 88 (205) | hydrocarbon paraffins |
| n-hexadecane | 62.1 | 16.7 | 102 (237) | hydrocarbon paraffins |
| n-heptadecane | 71.1 | 21.7 | 92 (214) | hydrocarbon paraffins |
| n-octadecane | 82.4 | 28 | 105 (244) | hydrocarbon paraffins |
| n-nanodecane | 89.6 | 32 | | hydrocarbon paraffins |
| n-eicosane | 98.1 | 36.7 | 106 (247) | hydrocarbon paraffins |
| n-heneicosane | 104.4 | 40.2 | 86 (200) | Hydrocarbon paraffins |
| n-decosane | 111.2 | 44 | 107 (249) | hydrocarbon paraffins |
| n-tricosane | 117.5 | 47.5 | 100 (233) | hydrocarbon paraffins |
| trimethylolethane | 178 | 81 | | mesocrystalline phase change |
| C-16 to C-22 alkyl hydrocarbons | 50-122 | 10-50 | >50 (>116) | alkyl hydrocarbons |
| natural rubber | Varies to 77 | Varies to 25 | | crystalline phase change |
| polychloropropene | 89.6 | 32 | >54 (>126) | |
| Witco 45A | 87.8 | 31 | >54 (>126) | crystalline alkyl hydrocarbons |
| Witco K-61 | 75.2 | 24 | >54 (>126) | crystalline alkyl hydrocarbons |
| Witco K-51 | 62.6 | 17 | >54 (>126) | crystalline alkyl hydrocarbons |
| Witco 85010-1 | 44.6 | 7 | >54 (>126) | crystalline alkyl hydrocarbons |
| pentaeythritol | plastic crystals (no change of state but release high amounts of E before melting) | | | |
| polyhydric alcohols | plastic crystals (no change of state but release high amounts of E before melting) | | | |
| acrylate and methacrylate polymers | 0 | -17.78 | | with C-16 to C-18 alkyl side chains |
| $CaBr_2 \cdot 6H_2O/NaCl$ | 59 | 15 | | hydration-dehydration Reaction |
| $Na_2SO_4 \cdot 10H_2O/NaCl$ | 64 | 17.78 | | hydration-dehydration reaction |
| $CaCl_2 \cdot 6H_2O$ | 82 | 27.78 | | hydration-dehydration reaction |
| $Na_2SO_4 \cdot 10H_2O$ | 90 | 32.22 | | hydration-dehydration reaction |
| $CaBr_2 \cdot 6H_2O$ | 93 | 33.89 | | hydration-dehydration reaction |

PU Gel/PCPU Gel Preparation

In another non-limiting embodiment, the polyol and optionally with additives such as, but not limited to, plastics, triblock and/or diblock elastomer resins, gel additives, and additives are degassed prior to mixing with isocyanate. Any kind of mixer may be used that is designed for liquid-liquid mixing or dispersion of a solid in a liquid. Non-limiting examples include tank agitators, homogenizers, high shear mixers, or rotary mixers. After mixing, the PU Gel liquid mixture is either poured in a mold to make various article forms, shapes or sizes such as spheres, powder, granular form, or particles with average particle size between the range of about 0.01 to about 12 millimeters, or reacted directly into a reacting polyurethane foam or latex foam mixture.

In another non-limiting embodiment, the polyol with phase change materials and optionally with property-enhancing additives, plastics, triblock and/or diblock elastomer resins, gel additives, and additives are degassed prior to mixing with isocyanate. Any kind of mixer may be used that is designed for liquid-liquid mixing or dispersion of a solid in a liquid. Non-limiting examples include tank agitators, homogenizers, high shear mixers, or rotary mixers. After mixing, the PCPU Gel liquid mixture is either poured in a mold to make various article forms, shapes or sizes such as spheres, powder, granular form, or particles with average particle size between the range of about 0.01 to about 12 millimeters, or reacted directly into a reacting polyurethane foam or latex foam mixture.

Larger articles of PU Gel or PCPU Gel may be ground down to particles with average particle size between the range of about 0.01 to about 12 millimeters. Talc or other coating solids may be added with the larger particles before and during the grinding process to coat the freshly cut PU gel or PCPU gel surfaces and prevent the particles from agglomerating. The grinding, chopping or other size reduction method may be any conventional method known or suitable for the purpose.

In a non-limiting embodiment, the liquid PCPU gel or PU gel mixture components except for isocyanate portion can be mixed in a tank and degassed. The mixture is pumped to a static mixer where the isocyanate is added before the static mixer and mixed. The mixture is optionally heated to speed the gelation reaction after the static mixer and/or after the liquid is sprayed through an orifice to produce discrete particles. There are other methods, known in the art of skill, of producing discrete drops from a liquid.

It will be appreciated that the methods described herein are not limited to these examples, since there are many possible combinations for combining PCPU Gel, PU Gel and some combination of both containing optional property-enhancing materials with a compatible carrier before incorporating said Gel particles into final polyurethane foam or latex foam in any form, shape or size such as spheres, powder, granular form, particles with average particle size between the range of about 0.01 to about 12 millimeters.

Applications of the Combined Gel and Polyurethane Foams

The list below shows some, but not all, of the applicable uses of the combination of Gel particles with optional thermally-conductive materials and property-enhancing additives and polyurethane foam or latex foam produced by the methods herein.

1. Mattresses, pillows, and bed-top products;
2. General furnishings and Upholstered furniture including pet beds, cushions, armrests, seat-backs, foot-rests, bath mats, decorative cushioning and functional support.
3. Rebond carpet pad or use as a floor mat (rebond carpet pad uses recycled foam to create the pad that goes under carpet, giving a cushioned feel and extra life to the carpet);
4. Use as a shoe insert foamed in-situ with energy absorption foam, viscoelastic foam or other foam;
5. Use in medical applications such as wheelchair seat cushions and backs, orthopedic shoes, hospital beds, gurney pads, medical bed pads, medical supports and cushioning;
6. Use in conventional polyether polyurethane foams, high resilient polyether polyurethane foams, viscoelastic polyether polyurethane foams, semi-rigid polyether polyurethane foams, rigid polyether polyurethane foams, polyester polyurethane foams, combined polyether-polyester foam or latex foam for general cushioning, energy absorption, packaging, sealants and fillers; and
7. Seat cushions, seat backs, headrests and armrests of chairs and seats for application in vehicles such as automobiles, motorcycles, bicycles, buses, aircraft, watercraft, tractors and other agricultural equipment such as com-bines, construction equipment and utility vehicles.
8. Combinations of molded foam and foams containing PCPU Gel particles, PU Gel particles, and combinations thereof.

One suitable application of the methods and compositions herein includes incorporating the PU Gel with optional property-enhancing materials in polyurethane foam. The PU Gel, optionally in combination with a carrier, may be added to the unreacted polyurethane components and incorporated in polyurethane foam. Adding PU Gel to polyurethane foam may result in improved support, higher thermal conductivity, and higher thermal storage capacity.

Another suitable application of the methods and compositions herein includes incorporating the PCPU Gel with optional property-enhancing materials in polyurethane foam. PCPU Gel, optionally in combination with a carrier, may be added to the unreacted polyurethane components and incorporated in the viscoelastic polyurethane foam. Adding PCPU Gel to polyurethane gel may result in improved support, higher thermal conductivity, and higher thermal storage capacity due to latent heat of absorption around the melting point temperature of the phase change material.

PU Gel or PCPU Gel particles less than 0.01 millimeters are not discretely visible in an open cell flexible polyurethane foam or latex foam and are usually incorporated into the struts or solid elastomers regions of flexible foam, acting more like a coloring pigment. Gel particles between about 0.01 millimeters and about 12 millimeters are preferable because the Gel particles are located within the foam open areas or "non-strut" regions. Gel particles have the unique property of acting as a heat transfer pathway when dispersed in an open cell flexible polyurethane foam or latex foam. When polyurethane foam containing Gel particles is compressed, Gel particles contact other Gel particles. Heat is more readily transferred from one Gel particle to the next Gel particle in contact or close proximity (relative to the open cell flexible foam), so that the thermal conductivity is increased and the migration of heat over longer distances is facilitated. Most preferably, the Gel particle size is between the range of about 0.1 to about 2 millimeters.

Flexible polyurethane foams or latex foams with the PCPU Gel, PU Gel or some combination described herein may find utility in a very wide variety of applications. More specifically and other, in non-limiting embodiments, the combined polymers would be suitable as pillows or pillow components, including, but not necessarily limited to, pillow wraps or shells, pillow cores, pillow toppers, for the production of medical comfort pads, medical mattresses and similar comfort and support products, and residential/consumer mattresses mattress toppers, and similar comfort and support products, typically produced with conventional flexible polyurethane foam or fiber. All of these uses and applications are defined herein as "bedding products". Alternatively, the combination gel/flexible polyurethane foams described herein are expected to be useful for the production of upholstered furniture to replace conventional foam, polyester fiber or other support materials. Examples of these applications include but are not limited to upholstered chair backs, head-rests, foot-rests, arm-rests, neck supports, quilting support and cushioning and the like and combinations thereof. All of these latter uses and applications are defined herein as "furniture upholstery".

The invention will now be described more specifically with respect to particular formulations, methods and compositions herein to further illustrate the invention, but which examples are not intended to limit the methods and compositions herein in any way. Tables 2a, 2b, 2c, 2d, 2e, 2f present PU Gel formulation examples and results of PCPU Gel and PU Gel and Table 3 shows the combination of PCPU Gel with polyurethane flexible foams made according to the methods described herein. The component definitions and descriptions used in making PU Gel and PCPU Gel are given in Table 4.

TABLE 2a

Gel Formulations and Results

| Component | Units | m14 | m15 | m16 | m41 | m42 | m49 | m50 | m4 | m5 | m6 |
|---|---|---|---|---|---|---|---|---|---|---|---|
| X54 |  | 100 | 100 | 100 |  |  |  |  |  |  |  |
| X56 |  |  |  |  | 100 | 100 | 100 |  |  |  |  |
| X57 |  |  |  |  |  |  |  | 100 |  |  |  |
| X58 |  |  |  |  |  |  |  |  | 100 | 100 | 100 |
| Plasticizer 1 | pph |  |  |  | 20 | 20 | 20 | 20 |  |  |  |
| T-Cat 120 | pph | 0.2 | 0.2 | 0.2 | 0.4 | 0.4 | 0.4 | 0.4 | 0.2 | 0.2 | 0.2 |
| MDI | pph | 18.49 | 21.14 | 23.78 | 7.05 | 8.13 | 6.72 | 11.34 | 4.86 | 5.56 | 6.25 |

TABLE 2a-continued

Gel Formulations and Results

| Component | Units | m14 | m15 | m16 | m41 | m42 | m49 | m50 | m4 | m5 | m6 |
|---|---|---|---|---|---|---|---|---|---|---|---|
| Index |  | 0.70 | 0.80 | 0.90 | 0.65 | 0.75 | 0.62 | 0.68 | 0.70 | 0.80 | 0.90 |
| Ball Rebound | % |  |  | 10 | 21 | 24 | 16 |  | 18 | 23 | 23 |
| Bloom Grams | grams | Liq | Liq | 218 | 533 | 1146 |  | Liq | 798 | 3190 | 4800 |
| Adhesion | in-lb |  |  | 0.14 |  |  |  |  |  |  |  |

TABLE 2b

Gel Formulations and Results

| Component | Units | m17 | m18 | m19 | m20 | m21 | m24 | m55 | m57 |
|---|---|---|---|---|---|---|---|---|---|
| X58 |  | 100 | 100 | 100 | 100 | 100 | 100 |  |  |
| X59 |  |  |  |  |  |  |  | 100 | 100 |
| Plasticizer 1 | pph | 5 | 10 | 20 | 30 | 40 | 20 | 20 | 10 |
| T-Cat 120 | pph | 0.2 | 0.2 | 0.2 | 0.2 | 0.2 | 0.4 | 0.4 | 0.4 |
| MDI | pph | 4.86 | 4.86 | 4.86 | 4.86 | 4.86 | 4.86 | 5.13 | 5.09 |
| Index |  | 0.70 | 0.70 | 0.70 | 0.70 | 0.70 | 0.70 | 0.64 | 0.63 |
| Ball Rebound | % | 23 | 23 | 24 | 23 | 23 | 22 | 11 | 10 |
| Bloom Grams | grams | 1079 | 798 | 551 |  |  | 668 | 107 |  |
| Adhesion | in-lb | 0.24 | 0.09 | 0.23 | 0.00 | 0.01 | 0.02 | 0.03 |  |

TABLE 2c

Gel Formulations and Results

| Component | Units | m47 | m51 | m64 | m65 | m66 | m67 | m68 | m69 | m70 | m104 | m105 |
|---|---|---|---|---|---|---|---|---|---|---|---|---|
| X59 |  | 100 | 100 | 100 | 100 | 100 | 100 | 100 | 100 | 100 | 100 | 100 |
| Plasticizer 1 | pph | 20 | 20 | 10 | 10 | 10 | 30 | 30 | 30 | 30 | 10 | 10 |
| Expancel 091 DE80 d30 | pph |  |  |  |  |  |  |  |  |  |  | 0.5 |
| PCM1 | pph |  |  |  |  |  | 10 | 25 | 50 |  |  |  |
| Talc | pph |  |  |  |  |  |  |  |  | 25 |  |  |
| T-Cat 120 | pph | 0.4 | 0.4 | 0.1 | 0.1 | 0.1 | 0.4 | 0.4 | 0.4 | 0.4 | 0.4 | 0.4 |
| MDI | pph | 5.09 | 5.17 | 5.09 | 5.25 | 5.09 | 5.05 | 5.05 | 5.09 | 5.09 | 5.16 | 5.16 |
| Index |  | 0.63 | 0.64 | 0.63 | 0.65 | 0.63 | 0.63 | 0.63 | 0.63 | 0.63 | 0.65 | 0.64 |
| Ball Rebound | % | 7 | 10 | 10 | 12 | 10 | 5 |  |  | 9 | 9 | 13 |
| Bloom Grams | grams |  |  | 54 | 175 | 66 | 18 | 12 |  | 46 | 76 | 125 |
| Adhesion | in-lb |  |  | 0.18 | 0.11 | 0.15 | 0.31 | 0.12 |  | 0.11 | 0.21 | 0.19 |

TABLE 2d

Gel Formulations and Results

| Component | Units | m23 | m22 | m71 | m72 | m73 | m74 | m75 | m76 | m79 | m80 |
|---|---|---|---|---|---|---|---|---|---|---|---|
| X58 |  | 100 | 100 | 100 | 100 | 100 | 100 | 100 | 100 | 100 | 100 |
| Plasticizer 1 | pph | 20 |  | 30 | 30 | 30 | 30 | 30 | 30 | 30 | 30 |
| Expancel 091 DE80 d30 | pph |  | 1.3 |  |  |  |  |  |  |  |  |
| PCM1 | pph |  |  | 10 | 10 | 25 | 50 | 50 | 100 | 150 | 50 | 50 |
| Talc | pph |  |  |  |  |  |  |  |  | 10 | 25 |
| T-Cat 120 | pph | 0.4 | 0.2 | 0.4 | 0.4 | 0.4 | 0.4 | 0.4 | 0.4 | 0.4 | 0.4 |
| MDI | pph | 4.86 | 4.86 | 4.86 | 4.86 | 4.86 | 5.21 | 5.07 | 5.07 | 4.86 | 4.86 |
| Index |  | 0.70 | 0.70 | 0.70 | 0.70 | 0.70 | 0.75 | 0.73 | 0.73 | 0.70 | 0.70 |

TABLE 2d-continued

Gel Formulations and Results

| Component | Units | m23 | m22 | m71 | m72 | m73 | m74 | m75 | m76 | m79 | m80 |
|---|---|---|---|---|---|---|---|---|---|---|---|
| Ball Rebound | % | 19 | 19 | 17 | 14 | 12 | 15 | 12 | | 13 | 12 |
| Bloom Grams | grams | 1039 | 530 | 406 | 307 | 264 | 629 | 888 | 1321 | 429 | 365 |
| Adhesion | in-lb | 0.01 | 0.00 | 0.03 | 0.02 | 0.02 | 0.01 | 0.01 | 0.01 | 0.01 | 0.02 |

TABLE 2e

Gel Formulations and Results

| Component | Units | m107 | m108 | m81 | m82 | m83 | m84 | m85 | m86 | m94 |
|---|---|---|---|---|---|---|---|---|---|---|
| X58 | pph | 100 | 100 | 100 | 100 | 100 | 100 | 100 | 100 | 100 |
| Plasticizer 1 | pph | 10 | 10 | 30 | 30 | 30 | 30 | 30 | 30 | 30 |
| SP-350 Plasticizer | pph | | | | | | | | | |
| PCM1 | pph | | | 50 | 50 | 50 | 50 | 50 | 50 | 50 |
| PCM2 | pph | | | | | | | | | |
| Talc | pph | 25 | 25 | | | | | | | |
| Starch | pph | | | 10 | 25 | | | | | |
| Natural Oil 1 | pph | | | | | 10 | 25 | | | |
| Natural Oil 2 | pph | | | | | | | 10 | 25 | 50 |
| Natural Oil 3 | pph | | | | | | | | | |
| T-Cat 120 | pph | 0.4 | 0.4 | 0.4 | 0.4 | 0.4 | 0.4 | 0.4 | 0.4 | 0.4 |
| MDI | pph | 4.45 | 4.45 | 4.86 | 4.86 | 4.86 | 4.86 | 4.86 | 4.86 | 4.86 |
| Index | | 0.64 | 0.64 | 0.70 | 0.70 | 0.70 | 0.70 | 0.70 | 0.70 | 0.70 |
| Ball Rebound | % | | | | | | 13 | 12 | 13 | 12 | 12 |
| Bloom Grams | grams | 348 | 295 | 33 | 5 | 226 | 132 | 249 | 185 | 241 |
| Adhesion | in-lb | 0.04 | 0.06 | 0.01 | 0.05 | 0.01 | 0.01 | 0.01 | 0.00 | 0.01 |

| Component | Units | m87 | m88 | m98 | m99 | m96 | m97 | m89 | m90 | m91 |
|---|---|---|---|---|---|---|---|---|---|---|
| X58 | pph | 100 | 100 | 100 | 100 | 100 | 100 | 100 | 100 | 100 |
| Plasticizer 1 | pph | 30 | 30 | 10 | | 30 | 10 | 30 | 30 | 30 |
| SP-350 Plasticizer | pph | | | | | | | 10 | 25 | |
| PCM1 | pph | 50 | 50 | 50 | 50 | 50 | 50 | 50 | 50 | 50 |
| PCM2 | pph | 10 | 25 | 25 | 25 | 50 | 50 | | | |
| Talc | pph | | | | | | | | | |
| Starch | pph | | | | | | | | | |
| Natural Oil 1 | pph | | | | | | | | | |
| Natural Oil 2 | pph | | | | | | | | | |
| Natural Oil 3 | pph | | | | | | | | | 10 |
| T-Cat 120 | pph | 0.4 | 0.4 | 0.4 | 0.4 | 0.4 | 0.4 | 0.4 | 0.4 | 0.4 |
| MDI | pph | 4.86 | 4.86 | 4.86 | 4.86 | 4.86 | 4.86 | 4.86 | 4.86 | 4.86 |
| Index | | 0.70 | 0.70 | 0.70 | 0.70 | 0.70 | 0.70 | 0.70 | 0.70 | 0.70 |
| Ball Rebound | % | 13 | 13 | 13 | 13 | 13 | 14 | 12 | 13 | 13 |
| Bloom Grams | grams | 325 | 247 | 455 | 1100 | 259 | 775 | 417 | 386 | 343 |
| Adhesion | in-lb | 0.01 | 0.00 | 0.00 | 0.01 | 0.01 | 0.01 | 0.02 | 0.01 | 0.02 |

TABLE 3

PCPU Gel in Polyurethane Foam

| | Unit | PCG-2 |
|---|---|---|
| X-65 | pph | 100 |
| Added Water | pph | 2.2 |
| Total Water | pph | 2.22 |
| L-618 | pph | 1 |
| ZF-10 | pph | 0.2 |
| T-110 | pph | 0.16 |
| m86 PCPU Gel | pph | 28 |
| MDI | pph | 46.97 |
| Cream Time | sec | 22 |
| Rise Time | sec | 135 |
| Blow | | None |
| Density | pcf | 3.95 |
| 25% IFD | lb/50 in$^2$ | 9.7 |
| Air Flow | SCFM | 4.2 |

Table 4 Component Definition and Descriptions

X-54 Polyol Blend from Peterson Chemical Technology, OH 113.8
X-56 Polyol Blend from Peterson Chemical Technology, OH 46.0
X-57 Polyol Blend from Peterson Chemical Technology, OH 71.4
X-58 Polyol Blend from Peterson Chemical Technology, OH 29.0
X-59 Polyol Blend from Peterson Chemical Technology, OH 33.7
PCM1 Phase change additive from Peterson Chemical Technology
PCM2 Phase change additive from Peterson Chemical Technology
Plasticizer 1 Hydrogenated naphthenic fluid from Peterson Chemical Technology
Plasticizer 2 Hydrogenated paraffinic fluid from Peterson Chemical Technology
Talc Talc from C.H. Crystal
Starch Starch from National Starch
Natural Oil 1 Natural oil with phase transition temperature approximately 77° F.
Natural Oil 2 Natural oil with phase transition temperature approximately 90° F.
Natural Oil 3 Natural oil with phase transition temperature less than −5° F.
ZF-10 Reactive catalyst available from Huntsman Chemicals
L-618 Silicone surfactant available from Momentive Performance Materials
MDI Polymeric MDI having a NCO content of about 32.6% with an average functionality of about 2.4
T-Cat 110 Stannous octoate catalyst available from Gulbrandsen Chemicals
T-Cat 120 Dibutyltindilaurate catalyst available from Gulbrandsen Chemicals Depending on the polyol and isocyanate system, the reactant mixture changes from a liquid to a solid as the isocyanate index increase. For a given polyol-isocyanate system, there is a narrow range of index, usually about 0.02-0.05 index units where the reactant mixture changes from a liquid to and solid. The reactant system viscosity increases almost exponentially with isocyanate index due to crosslinking between the polyol and isocyanate. Hardness, as measured by a modified Bloom gram test as defined herein, may be adjusted by the isocyanate index. The modified Bloom gram test was performed with a Chatillon TCD-200 instrument with 250 lbf load cell from Interface, Inc. An Omega data recorder recorded force measurements every second. A probe with 12.7 mm (0.5 inch) diameter faced off with sharp corners was used to compress the PCPU Gel and PU Gel samples. The gel samples were allowed to cure in a mold with dimensions of 6 cm length×6 cm width×2.54 cm depth. After the gel sample was fully cured, the gel sample, which was still in the mold, was centered under the probe and locked down. The probe was moved down until it contacted the gel sample. The Chatillon was programmed to compress the sample 4 mm at a speed of 0.5 in/min. Once the probe stopped movement, the probe position was maintained for 60 sec and then retracted at a 0.5 in/min speed while still taking force measurements. From the force curve, three measurements were taken. A peak force was measured which usually occurred when the probe stops at the 4 mm depth. The Bloom gram hardness was taken at the 60 sec relaxation period. The tackiness was measured by the peak negative force during probe retraction at 0.5 in/min.

In general, lower molecular weight (higher hydroxyl numbers) increase the hardness of PCPU Gel or PU Gel for a given isocyanate index and similar polyol functionalities. Plasticizers are added to help soften the gel, so that the crosslinking density is increased to maintain shape of the gel article and aid in tackification properties. Tables 2a-2e shows the Bloom gram hardness for different formulations. Hardness may be modified by adding property-enhancing solids, in a non-limiting list, such as talc, calcium carbonate. Hardness may also be modified by addition of water and/or auxiliary blowing agent to reduce the density of the PCPU gel or PU gel samples. Lower density PCPU gel or PU gel products generally tend to decrease the hardness. Hardness may also be modified by addition of Expancel microspheres to reduce the density. However, rate of change of hardness reduction versus density reduction with the Expancel microspheres is not as large as the hardness reduction versus density reduction for the water and/or auxiliary blowing agents.

The tackiness of the PCPU gel or PU gel increases as the index is lowered. The adhesion factor was calculated based on the product of the average negative force while the Bloom gram probe was pulled away from the gel after the probe indented the sample by 4 mm and after the 60 sec relaxation time at 4 mm indention and the amount of probe travel before the sample released from the probe. Tables 2a-2e show the adhesion factor for different formulations. The polyurethane gel elastomer may have an adhesion factor of 0.20 in-lb or less; alternatively 0.15 in-lb or less; in another non-limiting embodiment 0.12 or less.

Viscoelastic properties of the PCPU gel or PU gel, as measured by ball rebound, increases as the index is lowered. The ball rebound is performed by a modified method of ASTM D3574. However, the gel sample is 6 cm×6 cm×2.54 cm. The ball rebound is reported as a percentage of the original height that the steel ball drop point. Lower ball rebound numbers indicate higher viscoelastic properties. PU gel may show viscoelastic dampening properties, particularly with lower index levels in the range of 0.62 to 0.75. Ball rebound values reduce as the gel formula approaches the liquid-solid transition with lower indexes. For a given polyol—isocyanate system, the ball rebound tracks logarithmically with the Bloom gram hardness.

Another advantage of the methods and compositions herein is an improvement in the thermal conductivity or heat transfer properties. Foams may be tested in accordance with ASTM E1225—Standard test method for thermal conductivity of solids by means of the guarded-comparative-longitudinal heat flow technique.

Polyurethane foams produced with in-situ PCPU Gel will have a higher thermal storage capacity than non-PCPU Gel polyurethane foams. This property is important when the polyurethane foams with in-situ PCPU Gel are used in bedding products. Higher heat capacity in combination with higher thermal conductivity will transfer heat away from the contact surface between a person and the foam. The foam will thus have a cooler feel for a person in contact with the foam.

Addition of phase change materials to the gel allows the foam article to store or release large amounts of energy when the phase change material changes state. The storage or release of heat is higher than heat absorption or release by the polyurethane foam and gel heat capacities. Heat is stored if the solid phase change material changes to a liquid, and heat is released when the liquid phase change material changes to a solid. When the solid phase change material changes to a liquid, the phase change material has a cooling effect to the human in contact with the foam. The melting point temperature is usually chosen to be in the 20° C. to 30° C. range to match the human comfort zone.

Many modifications may be made in the methods of and implementation of this invention without departing from the spirit and scope thereof that are defined only in the appended claims. For example, the exact phase change materials or phase change additives, thermal conductivity materials, latex foams, triblock and/or diblock elastomer resins, gel additives, polyols, isocyanates, catalysts and additives used may be different from those used explicitly mentioned or suggested here. Additionally, techniques and methods for improving the properties and/or processing characteristics of Gel and polyurethane foams other than those specifically mentioned may find utility in the methods herein. Various combinations of phase change materials or phase change additives, PCPU Gels, PU Gels, thermal conductivity materials, triblock and/or diblock elastomer resins, polyols, isocyanates, catalysts, gelation catalysts, blowing catalysts, thermally-conductive materials, water, blowing agents, additives, and processing temperatures and pressures besides those explicitly mentioned herein are expected to be useful.

The words "comprising" and "comprises" as used throughout the claims is interpreted "including but not limited to".

The present invention may suitably comprise, consist or consist essentially of the elements disclosed and may be practiced in the absence of an element not disclosed. For instance, in one non-limiting embodiment the compositions herein have an absence of a barrier layer. Alternatively there may be provided a composition comprising a combination of polyurethane foam and polyurethane gel particles produced by the method consisting essentially of or consisting of reacting one or more polyols with hydroxyl values from 10-170 and with functionality greater or equal to 3; one or more polyols with hydroxyl values from 170-1400 and with functionality of 2; and one or more polyisocyanates with NCO functionality of 2 to 8, where the gel polymer has a polyisocyanate index between 0.62 to 0.90, where the polyurethane gel elastomer is prepared in the presence of at least one blowing catalyst, and at least one phase change material, to make a polyurethane gel elastomer. The method may further consist essentially of or consist of reducing the polyurethane gel elastomer into particles having an average particle size of about 12 mm or less; introducing the polyurethane gel particles into a mixture of polyurethane foam-forming components comprising a polyol and an isocyanate; and polymerizing the polyol and the isocyanate to form an open cell flexible polyurethane foam; where said polyurethane gel particles are added in the range of about 0.1 to about 200 parts per hundred of the polyol component of polyurethane foam.

Additionally, there may be provided a compositions consisting essentially of or consisting of a combination of latex foam and polyurethane gel particles produced by the method consisting essentially of or consisting of reacting one or more polyols with hydroxyl values from 10-170 and with functionality greater or equal to 3; one or more polyols with hydroxyl values from 170-1400 and with functionality of 2; and one or more polyisocyanates with NCO functionality of 2 to 8, where the gel polymer has a polyisocyanate index between 0.62 to 0.90, where the polyurethane gel polymer is prepared in the presence of at least one blowing catalyst, at least one phase change material, to make a polyurethane gel elastomer. The method further consists essentially of or consists of reducing the polyurethane gel elastomer into particles having an average particle size of about 12 mm or less; introducing the polyurethane gel particles into a mixture of latex foam forming components; and polymerizing the latex foam forming components to form an open cell flexible latex foam; where said polyurethane gel particles are added in the range of about 0.1 to about 200 parts per hundred of the latex foam forming components.

What is claimed is:

1. A composition comprising a combination of open cell flexible polyurethane foam and polyurethane gel particles produced by the method comprising:
   a. reacting one or more polyols with hydroxyl values from 10-170 and with functionality greater or equal to 3; one or more polyols with hydroxyl values from 170-1400 and with functionality of 2; and one or more polyisocyanates with NCO functionality of 2 to 8 to make a polyurethane gel elastomer having a polyisocyanate index between 0.62 to 0.90, where the polyurethane gel elastomer is prepared in the presence of (i.) at least one gelation catalyst to make a polyurethane gel elastomer and (ii.) a phase change material;
   b. reducing the polyurethane gel elastomer into polyurethane gel particles having an average particle size between the range of about 0.01 to about 12 millimeters;
   c. introducing the polyurethane gel particles into a mixture of polyurethane foam-forming components comprising a polyol and an isocyanate;
   d. polymerizing the polyol and the isocyanate to form an open cell flexible polyurethane foam containing thermally conductive polyurethane gel particles, the thermally conductive gel particles at least partially containing phase change material for thermal storage capacity;
   where said polyurethane gel particles are added in the range of about 0.1 to about 200 parts per hundred of the polyol component of polyurethane foam.

2. The composition of claim 1 where the polyurethane gel particles contain at least one phase change material with a solid/liquid phase transition temperature range of from about −10° F. to about 220° F. (about −23° C. to about 104° C.).

3. The composition of claim 1 where the polyurethane gel particles contain at least one phase change material selected from a group consisting of glycerol, acetic acid, polyethylene glycol, crosslinked polyethylene glycol, camphene, oxazoline, DOP, DINP, a wax that changes from a liquid to a solid over the temperature range of expected use, d-lactic acid, formic acid, acrylic acid, p-xylene, caprylic acid, jojoba wax, cotton seed oil, coconut oil, rice oil, water, almond oil, beechnut oil, black mustard oil, candlenut oil, castor oil, corn oil, cotton seed stearin, esparto, poppy seed oil, rape seed oil, canola oil, pumpkin seed oil, beeswax, $NH_4Cl.Na_2SO_4.10H_2O$, $NaCl.NH_4Cl.2NaSO_4.20H_2O$, $NaCl.Na_2SO_4.10H_2O$, n-tetradecane, n-pentadecane, n-hexadecane, n-heptadecane, n-octadecane, n-nanodecane, n-eicosane, n-heneicosane, n-decosane, n-tricosane, trimethylolethane, neopentyl glycol, lithium chloride, calcium chloride hydrate, 1-decanol octadecane, C-16 to C-22 alkyl hydrocarbons, natural rubber, polychloropropene, crystalline alkyl hydrocarbons, pentaerythritol, polyhydric alcohols, acrylate and methyacrylate polymers, $CaBr_2.6H_2O$/NaCl, $Na_2SO_4.10H_2O$/NaCl, $CaCl_2.6H_2O$, $Na_2SO_4.10H_2O$, $CaBr_2.6H_2O$, and combinations thereof.

4. The composition of claim 2 where the phase change material is encapsulated.

5. The composition of claim 2 where the phase change material has the form of a particle having an average particle size of less than 1000 microns.

6. The composition of claim 1 where the polyurethane gel particles comprise a thermally conductive material.

7. The composition of claim 6 where the thermally conductive material is a solid and has a thermal conductivity from 0.1 W/m K to 2000 W/m K.

8. The composition of claim 6 where the thermally conductive material is selected from a group of talc, melamine, carbon black, graphite, aluminum oxide, aluminum nitride, zinc oxide, ferric oxide, diamond, titanium dioxide, magnesium oxide, silicon carbide, boron nitride, sodium carbonate, sodium bicarbonate, calcium carbonate, barium sulfate, metallic flakes.

9. An article of manufacture comprising the composition of claim 1 where the article is selected from the group consisting of rebond carpet pads, floor mats, bath mats, pet beds, shoe inserts, medical foams, mattresses, pillows, bedding products, seat cushions, seat backs, head rests, armrests and combinations thereof.

10. An article of manufacture comprising the composition of claim 1 where the flexible polyurethane foam is selected from the group consisting of polyether polyurethane foam, high-resiliency polyether polyurethane foam, viscoelastic polyether polyurethane foam, polyester polyurethane foam and combinations thereof.

11. An article of manufacture comprising the composition of claim 1 wherein the combination of polyurethane gel particles and polyurethane foam is layered with at least one other material selected from the group consisting of:
   a. a flexible viscoelastic foam,
   b. a flexible resilient polyurethane foam,
   c. a flexible high resilient (HR) foam,
   d. a latex foam, and
   e. combinations thereof.

12. The composition of claim 1 where the polyurethane gel elastomer is prepared in the presence of an additional component selected from the group consisting of a blowing catalyst, a plasticizer, water, a blowing agent and combinations thereof.

13. The composition of claim 1 where the thermally conductive polyurethane gel particles contact each other upon compression of the polyurethane foam.

14. A composition comprising a combination of open cell flexible polyurethane foam and polyurethane gel particles produced by the method comprising:
   a. reacting one or more polyols with functionality greater or equal to 3; one or more polyols with functionality of 2; and one or more polyisocyanates to make a polyurethane gel elastomer having a polyisocyanate index between 0.62 to 0.90, where the polyurethane gel elastomer is prepared in the presence of (i.) at least one gelation catalyst to make a polyurethane gel elastomer and (ii.) a phase change material;
   b. reducing the polyurethane gel elastomer into polyurethane gel particles having an average particle size between the range of about 0.01 to about 12 millimeters;
   c. introducing the polyurethane gel particles into a mixture of polyurethane foam-forming components comprising a polyol and an isocyanate;
   d. polymerizing the polyol and the isocyanate to form an open cell flexible polyurethane foam containing thermally conductive polyurethane gel particles, the thermally conductive gel particles at least partially containing phase change material for thermal storage capacity;

where said polyurethane gel particles are added in the range of about 0.1 to about 200 parts per hundred of the polyol component of polyurethane foam.

15. The composition of claim 14 where the polyurethane gel particles contain at least one phase change material with a solid/liquid phase transition temperature range of from about −10° F. to about 220° F. (about −23° C. to about 104° C.).

16. The composition of claim 14 where the polyurethane gel particles contain at least one phase change material selected from a group consisting of glycerol, acetic acid, polyethylene glycol, crosslinked polyethylene glycol, camphene, oxazoline, DOP, DINP, a wax that changes from a liquid to a solid over the temperature range of expected use, d-lactic acid, formic acid, acrylic acid, p-xylene, caprylic acid, jojoba wax, cotton seed oil, coconut oil, rice oil, water, almond oil, beechnut oil, black mustard oil, candlenut oil, castor oil, corn oil, cotton seed stearin, esparto, poppy seed oil, rape seed oil, canola oil, pumpkin seed oil, beeswax, NH4Cl.Na2SO4.10H2O, NaCl.NH4 Cl.2NaSO4.20H2O, NaCl.Na2SO4.10H2O, n-tetradecane, n-pentadecane, n-hexadecane, n-heptadecane, n-octadecane, n-nanodecane, n-eicosane, n-heneicosane, n-decosane, n-tricosane, trimethylolethane, neopentyl glycol, lithium chloride, calcium chloride hydrate, 1-decanol octadecane, C-16 to C-22 alkyl hydrocarbons, natural rubber, polychloropropene, crystalline alkyl hydrocarbons, pentaerythritol, polyhydric alcohols, acrylate and methacrylate polymers, CaBr2.6H2O/NaCl, Na2SO4.10H2O/NaCl, CaCl2.6H2O, Na2SO4.10H2O, CaBr2.6H2O, and combinations thereof.

17. The composition of claim 14 where the phase change material is encapsulated.

18. The composition of claim 14 where the phase change material has the form of a particle having an average particle size of less than 1000 microns.

19. The composition of claim 14 where the polyurethane gel particles comprise a thermally conductive material.

20. The composition of claim 19 where the thermally conductive material is a solid and has a thermal conductivity from 0.1 W/m K to 2000 W/m K.

21. The composition of claim 19 where the thermally conductive material is selected from a group of talc, melamine, carbon black, graphite, aluminum oxide, aluminum nitride, zinc oxide, ferric oxide, diamond, titanium dioxide, magnesium oxide, silicon carbide, boron nitride, sodium carbonate, sodium bicarbonate, calcium carbonate, barium sulfate, metallic flakes.

22. An article of manufacture comprising the composition of claim 14 where the article is selected from the group consisting of rebond carpet pads, floor mats, bath mats, pet beds, shoe inserts, medical foams, mattresses, pillows, bedding products, seat cushions, seat backs, head rests, armrests and combinations thereof.

23. An article of manufacture comprising the composition of claim 14 where the flexible polyurethane foam is selected from the group consisting of polyether polyurethane foam, high-resiliency polyether polyurethane foam, viscoelastic polyether polyurethane foam, polyester polyurethane foam and combinations thereof.

24. An article of manufacture comprising the composition of claim 14 wherein the combination of polyurethane gel particles and polyurethane foam is layered with at least one other material selected from the group consisting of:
   f. a flexible viscoelastic foam,
   g. a flexible resilient polyurethane foam,
   h. a flexible high resilient (HR) foam,
   i. a latex foam, and
   j. combinations thereof.

25. The composition of claim 14 where the polyurethane gel elastomer is prepared in the presence of an additional component selected from the group consisting of a blowing catalyst, a plasticizer, water, a blowing agent and combinations thereof.

26. The composition of claim 14 where the thermally conductive polyurethane gel particles contact each other upon compression of the polyurethane foam.

\* \* \* \* \*